United States Patent [19]
Tate et al.

[11] Patent Number: 5,991,774
[45] Date of Patent: Nov. 23, 1999

[54] METHOD FOR IDENTIFYING THE VALIDITY OF AN EXECUTABLE FILE DESCRIPTION BY APPENDING THE CHECKSUM AND THE VERSION ID OF THE FILE TO AN END THEREOF

[75] Inventors: Allan R. Tate, Bedford; Michael J Saylor, Carlisle, both of Mass.; John T. Grosser, Derry, N.H.

[73] Assignee: Schneider Automation Inc., North Andover, Mass.

[21] Appl. No.: 08/995,711

[22] Filed: Dec. 22, 1997

[51] Int. Cl.⁶ ....................................................... G06F 11/08
[52] U.S. Cl. .................... 707/203; 707/202; 395/184.01; 395/703; 395/712
[58] Field of Search ..................................... 707/203, 200, 707/202, 201, 8; 395/712, 703, 704, 181, 184.01

[56] References Cited

U.S. PATENT DOCUMENTS

| | | | |
|---|---|---|---|
| 4,792,898 | 12/1988 | McCarthy et al. | 711/118 |
| 5,537,540 | 7/1996 | Miller et al. | 395/183.14 |
| 5,539,879 | 7/1996 | Pearce et al. | 395/184.01 |
| 5,649,089 | 7/1997 | Kilner | 395/182.04 |
| 5,680,611 | 10/1997 | Rail et al. | 707/101 |
| 5,745,679 | 4/1998 | Mercer et al. | 707/203 |
| 5,752,251 | 5/1998 | Cripps | 707/202 |
| 5,754,861 | 5/1998 | Kumar | 395/704 |
| 5,815,722 | 9/1998 | Kalwitz et al. | 395/712 |
| 5,845,128 | 12/1998 | Nobel et al. | 395/712 |
| 5,852,813 | 12/1998 | Guenther et al. | 705/408 |

OTHER PUBLICATIONS

Radai, y., "Checksumming techniques for anti-viral purposes" Computer Science and Technology, v.13, Sep. 7–11, abstract only, 1992.

Huang et al., Some weak points of one fast cryptographic checksum algorithm and its improvement, Computers & Security, vol. 7, No. 5, abstract only, Oct. 1988.

Ritter. T., "The great CRC mystery", Dr. Dobbs J. Software Tools, vol. 11, No. 2, abstract only, 1986.

*Primary Examiner*—Jean R. Homere
*Attorney, Agent, or Firm*—Michael J. Femal; Larry I. Golden

[57] ABSTRACT

A method for uniquely identifying a file, along with its particular version ID, used in an application program by a central processing unit provides a system for file security. The method computes a CRC for a file and then appends a version string and CRC at the end of the file according to its version ID. The added CRC/version record information is non-destructive. Once appended, the record will be transported with the file when ever it is moved or copied. CRC allows the integrity of the file to be verified at any time and is used to detect viruses or corrupted or tampered files at startup and also during runtimes of the file and its associated application. The operating system will store the new file length in a file allocation table and will also copy a file seal with the file. When used with a set of files for a particular installation, the file seal provides a unique bill of materials to identify the exact file contents of the particular installation. Down loadable files will then be compared with the allocation table to verify the version of the files and will provide error messages if they are not compatible with the installed system base.

8 Claims, 5 Drawing Sheets

Fig. 5

| OP | /-L | /L | /-M | /M | | /-C | | /C | | VERIFY | |
|---|---|---|---|---|---|---|---|---|---|---|---|
| INITL MCL | FINL MCL | FINL MCL | FINL MCL | FINL MCL | ER | FINL MCL | ER | FINL MCL | ER | FINL MCL | ER |
| --- | --- | --L | --- | --- | E1,E2 | --- | --C | --C | | --- | |
| --L | --- | --L | --L | --L | E1,E2 | | | --L | E7 | --L | |
| -C- | -C- | -CL | -C- | MC- | | | E5 | -C- | | -C- | |
| -CL | -C- | -CL | -CL | MCL | | -CL | | -CL | | -CL | |
| M-- | M-- | M-L | --- | M-- | E3,E4 | M-- | | M-- | E8,E9 | M-- | E8 |
| M-L | M-- | M-L | --L | M-L | E3,E4 | M-L | E6 | M-L | E8,E9 | M-L | E8 |
| MC- | MC- | MCL | -C- | MC- | | MC- | E5 | MC- | | MCL | |
| MCL | MC- | MCL | -CL | MCL | | MCL | | MCL | | MCL | |

| ERROR CODE | DESCRIPTION |
|---|---|
| E1 | ERROR, FILE NOT MARKED BECAUSE CRC RECORD MISSING. |
| E2 | ERROR, FILE NOT MARKED BECAUSE CRC VERIFICATION FAILED. |
| E3 | ERROR, FILE ALREADY MARKED AND CRC RECORD MISSING. |
| E4 | ERROR, FILE ALREADY MARKED AND CRC VERIFICATION FAILED. |
| E5 | ERROR, CRC NOT REMOVED BECAUSE FILE IS LOCKED. |
| E6 | ERROR, CRC NOT REMOVED BECAUSE FILE IS MARKED AS SEALED. |
| E7 | ERROR, CRC NOT APPENDED BECAUSE FILE IS LOCKED. |
| E8 | ERROR, FILE MARKED AS SEALED BUT MAY BE CORRUPTED BECAUSE CRC RECORD MISSING. |
| E9 | ERROR, FILE MARKED AS SEALED BUT MAY BE CORRUPTED BECAUSE CRC VERIFICATION FAILED. |

*Fig. 6*

METHOD FOR IDENTIFYING THE VALIDITY OF AN EXECUTABLE FILE DESCRIPTION BY APPENDING THE CHECKSUM AND THE VERSION ID OF THE FILE TO AN END THEREOF

TECHNICAL FIELD

Applicants' invention relates generally to the field of control systems having a central processing unit and more particularly to a system for verifying the validity of a file used for controlling the control system.

BACKGROUND ART

Remote monitoring and control of systems and processes have taken many forms. Communication between a control system and a remote location by modems have made it possible to access the control system from different locations for downloading and uploading files. These files could be simply data files or libraries, but they also could be executable files used for controlling the control system. Various methods have been developed to provide a method to insure that the received file has not been corrupted during the transferring of the files. These methods can range from the very simple parity bit checking to the more complex check sum methods, such as Cyclic Redundancy Check (CRC). The most common technique is to have a specific file type defined to have a header having a CRC or checksum record. Most headers however, do not contain any information about the file itself. In a rapidly changing environment, operating programs are continuously being improved. Numbers or letters are used to identify a particular file or program version. When a particular file is loaded into the control system, it is extremely important to be able to identify its version number to verify that it is compatible with the existing files. Incompatibility could result in operational failures of the control system.

Further problems could occur in the control system itself after the files have been downloaded or installed. If the files are embedded in the controller in a hardware random access memory (RAM) or stored on a hard disk, potential errors may occur due to file or memory corruption, or unintended changes in user files. These problems could occur during runtime or during standby.

It would be desirable to develop an automation control system whereby these and other associated problems are detected, providing a high degree of security to an end user and allow for the use of general, commercial networks such as the Internet in place of specialized industrial networks to transport data files, libraries, and executable files to automation control systems and other devices.

SUMMARY OF THE INVENTION

Accordingly, the principal object of the present invention is to provide a method for identifying any version of a file used in industrial control system.

Another object of the present invention is to provide a method to determine if a file has been corrupted at any time through a virus, random noise, or hardware failure, including during transportation from one location to another, or during runtime or standby conditions.

Yet another object of the present invention is to provide a method to verify a set of files that comprise a particular release of software for an operating system or other installations.

In the preferred embodiment of the invention, as applied to an industrial controller system running an application program for controlling output devices in response to status of input devices, the invention comprises a method for uniquely identifying files, along with their particular version ID, of any kind used in the control system. A sealfile program computes a CRC for a file and then appends a version string and CRC at the end of the file according to its version ID. The added CRC/version record information is non-destructive. CRC allows the integrity of the file to be verified at any time and is used to detect viruses or corrupted or tampered files at startup and also during runtimes for the control system. The CRC/Version record is appended at the end of a file as a seal and is not part of the file itself. Once appended, the record will be transported with the file when moved or copied.

The CRC/version seal functions similar to a virus, except that the seal is benign. The operating system of the controller stores the new file length in a file allocation table (FAT) and will also copy the file seal with the file. When used with a set of files for a particular installation, the file seals provide a unique bill of materials to identify the exact file contents of the particular installation. Down loadable files will then be compared with the bill of materials to verify the version of the files and will provide error messages if they are not compatible with the installed system base. Follow-up service at a particular installation will be able to have direct access to the allocation table to verify the integrity of the installed database.

Use of the CRC records provides verification of the installed software at an installation, provides protection of files against viruses, tampering, or corruption, and provides an identification of the exact version of the installed software on any computer.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

BRIEF DESCRIPTION OF THE DRAWINGS

FIG. 5 provides a table for some transformation rules by the file seal module when examining files according to the present invention.

FIG. 6 provides a table of possible error messages returned by the file seal module after examining and detecting an error in the examined file.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
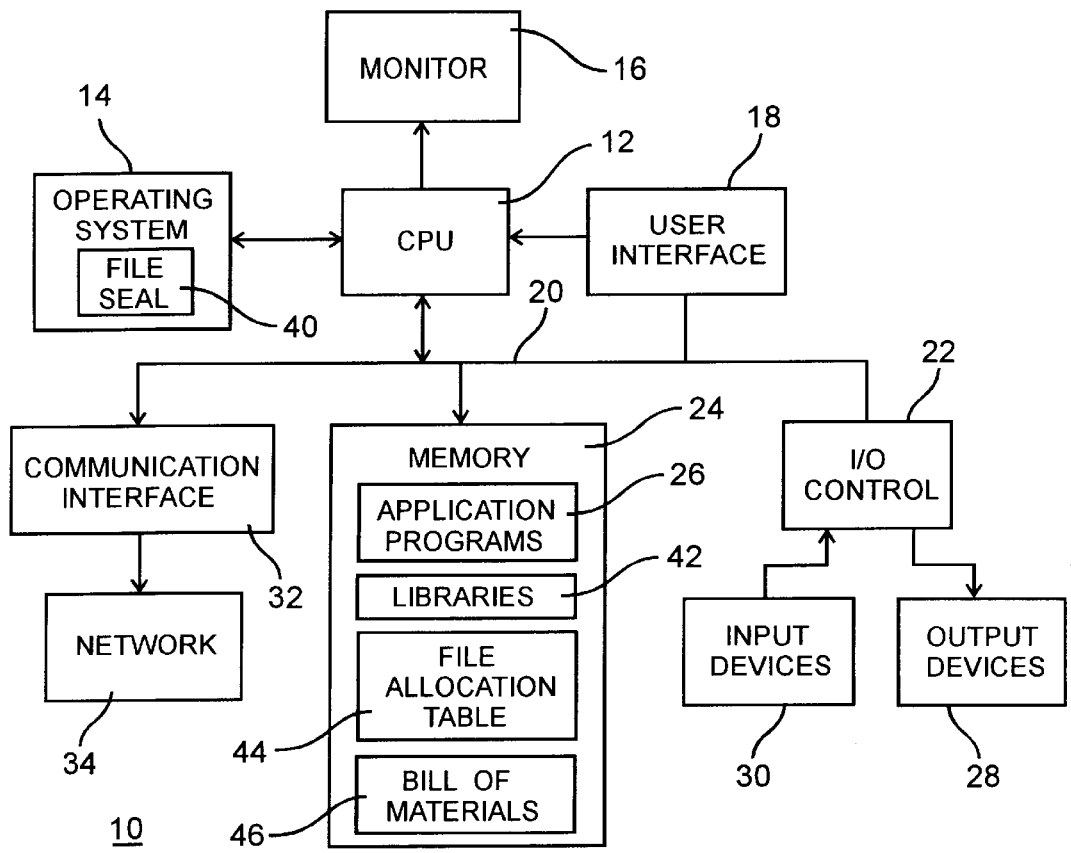
FIG. 1 shows an overview block diagram of a typical system illustrating the relationship between a file seal module according to the present invention and other components in a process control system.

FIG. 1 shows an overview block diagram of a typical system 10 illustrating an embodiment of the present invention. Although a control system is shown, it is to be understood that the present invention can be implemented in any type of system which involves the transfer or installation of files, whether they be executable files, data files, or library files. A central processing unit (CPU) 12 controls the overall system 10 with an operating system 14. A monitor 16 may provide visuals or graphics of the system operation. A user interface 18 provides means for monitoring, controlling, and modifying the system 10. An internal data bus 20 couples an input/output control 22 and memory 24 to the CPU 12. Application programs 26 are used to control output devices 28 in response to control signals from input devices 30. Communication outside of the control system is handled by a communication interface 32 to a network 34. A file seal module 40 provides data security and integrity by computing a CRC for each executable file in the application programs 26 and selected data located in library 42. It then appends a version string and CRC at the end of the file according to its version ID. The added CRC/version record information is non-destructive. Once appended, the record will be transported with the file when moved or copied.

A separate Bill of Materials (BOM) 46 could be added which will have a listing of each executable or library file sealed with an unique version identification number or letter each time the file is built. This will provide for identifying each version of a file to be unique and prevent it from being used or being installed in place of another version at a different location not authorized for that version. The version seal does not rely on the date, time or file size. This will allow for releasing a unique BOM 46 that identifies the version of every file in the a particular location. A patch could update this BOM file as updates are made to the installation.

The CRC/version seal functions similar to a virus, except that the seal is benign. The operating system 14 will store the new file length in a file allocation table (FAT) 44 and will also copy the file seal with the file. Down loadable files either from the network 34 or from user interface 18 will then be compared with the allocation table 44 to verify the version of the files and will provide error messages if they are not compatible with the installed system base.

The CRC is a system for checking errors between a transmitting location and a receiver. It consists of two check characters generated at the receiver and added to the end of the transmitted data characters. The receiver uses the same method to generate its own CRC for the incoming data and compares it to the CRC sent by the transmitter to ensure that the data was properly transmitted. A complete derivation for the CRC is well known and not a part of the present invention. The essential steps for calculating the CRC are as follows:

The data bits of the message are multiplied by the number of bits in the CRC. This is usually 16 or 32.

The resulting product is then divided by a generating polynomial using modulo 2 with no carries. The generating polynomial is expressed algebraically as a string of terms of powers of $x_1$ which is then converted to a binary number. CRC-16 uses the polynomial $x16+x15+x2+x0$, which translates into the binary number 1 1000 0000 0000 0101.

The quotient is disregarded and the CRC remainder is added to the end of the data bits and the result is transmitted to the receiver.

The receiver then divides the received message with the CRC by the same generating polynomial. The received message transmission is considered to have been received without error if the remainder is zero.

The file seal module 40 seals files with a CRC to provide security using the following a command line syntax:

SEALFILE [/[-]L] [/[-]M] [/[-]C] [/V=mm.nn.bb] [/E=xxx] [/Q] [/S] file    (1)

where:

file The file, directory, or list of files to process.

/L Lock file.

/M Mark file as sealed with a CRC.

/C Append CRC to end of file.

N Append version label to file.

/E Exclude files with extensions xxx from operation.

/Q Quiet mode.

/S Subdirectories included.

The /L switch will lock any file. This is done by setting the read-only bit. The /-L switch will unlock any file. This is done by clearing the read-only bit. The /M switch marks files as sealed provided that the CRC is correct. This is done by clearing the archive bit. Trying to mark a file with an invalid CRC is an error. This option is provided for the case where the file has been previously sealed with a CRC. The CRC does not have to be recalculated if the CRC that was previously appended to the file to can be used for verification. The /-M switch will remove the CRC seal mark. This is done by setting the archive bit. The IC switch will append a CRC to the end of a file. If the file is marked as already sealed with a CRC, then the CRC will not be rewritten and an error will occur if the existing CRC is incorrect. The CRC will also not be rewritten if the file is locked. The /-C switch will remove an appended CRC from the end of a file. The CRC, however, will not be removed if the file is marked as sealed or the file is locked.

The /V switch will append a version label to the end of a file. This switch can only be used in combination with the IC switch. There is no /-V switch because the version label will be removed along with the CRC (/-C). The /E switch will prevent files with the specified extension from being processed. This switch can be specified multiple times to exclude more than one extension. The /S switch will cause the program to search all subdirectories and perform the desired operation on each file that matches the file specification.

There are several undocumented switches which are also supported, including:

/permanent which will label the file seal permanent, making it not be possible to remove it with the /-C switch. The /debug switch will enable a diagnostic output and disable the self test. It is necessary to use this switch to seal the file seal module 40 itself. Unless properly sealed, the file seal module 40 will not run. /QE and /QU are modified quiet modes. Switch /QE is quiet except for files that are in error and switch /QU is quiet except for files that are unmarked, unsealed, or in error.

If no operational switches are specified, the current status of the file will be reported, per the following. If the archive bit is clear then the file seal module 40 will report that the file is marked as sealed with a CRC. The CRC will be verified. If the CRC is not present, wrong, or corrupted then the reason will be reported. If the read-only bit is set then it will be reported that the file is locked.

Several switches can be used in combination following certain rules. Each operational switch (/L, /M, and /C) can be specified only once. The /V switch can only be used in combination with the /C switch. This switch can be specified only once. The /S switch can be used with any of the other switches. The /E switch can be used with any of the other switches and may be specified multiple times.

Figure 2:
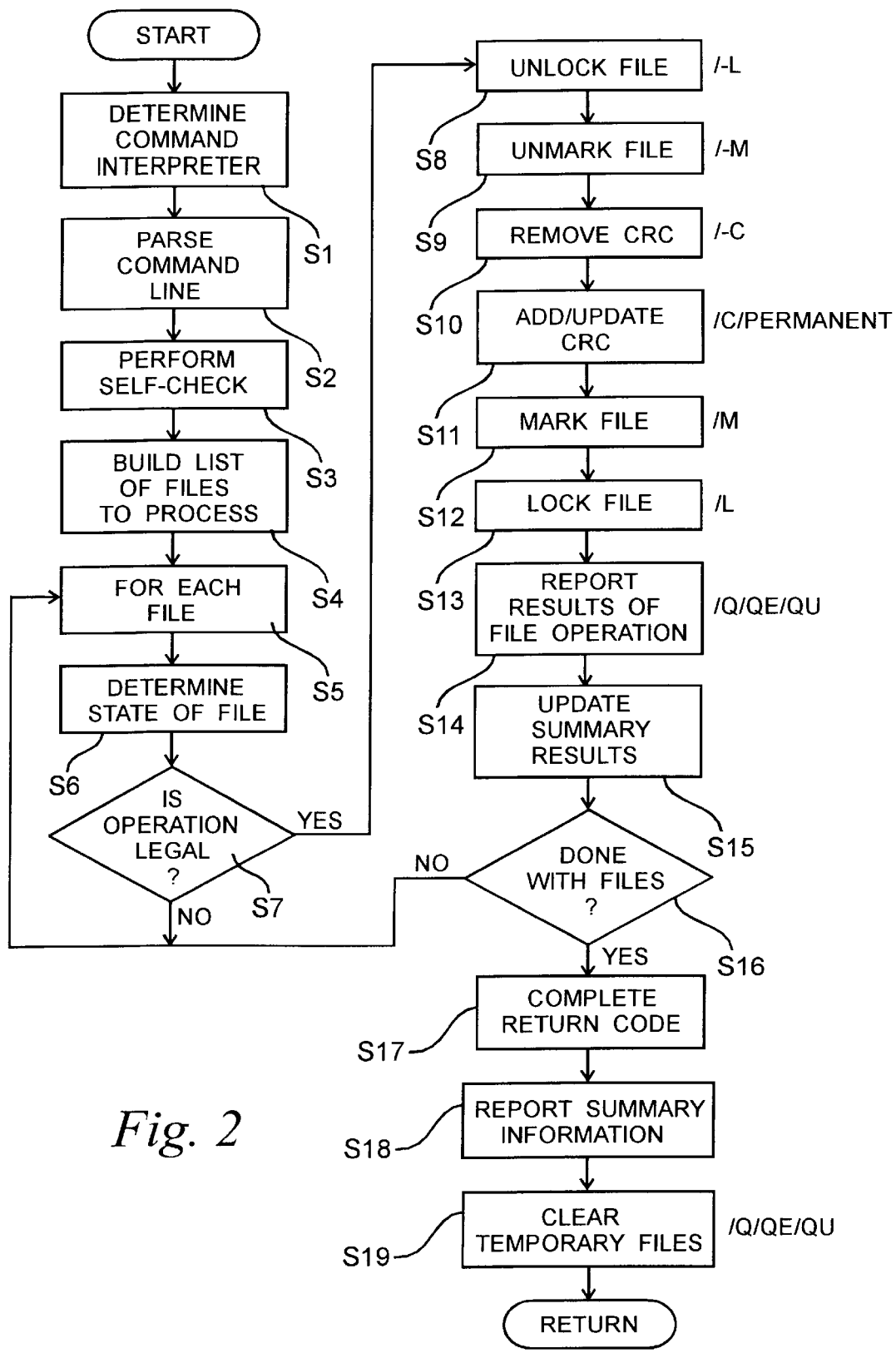
FIG. 2 is a flow chart detailing the sequence of steps used by the file seal module 40 as disclosed by FIG. 1 for examining files according to the present invention.

The file seal module 40 will function as outlined by the flow chart of FIG. 2. The system operating system will start the file seal module 40 by looking S1 at the command line (1) using the appropriate system 4 DOS, NDOS or standard COMMAND.COM. This will occur during startup and periodically during the runtime of the overall system The command line (1) will be parsed S2 to determine what switches are associated with the application. Before proceeding any further, the file seal module 40 will perform a self check utility S3 to insure that itself has not been corrupted before operating on any other files. A temporary file will be constructed S4 to build a list of all the files that are to be examined. A loop S5 will be made for each listed file. Each file will be examined to determine the switch status S6 for each type of file. This includes checking to see that the file actually exists, is locked, marked, or sealed, has a correct or permanent seal. Various switches can be used in combinations with each. Therefore they have to be checked S7 to verify that the combinations are legal, as will be explained below. If not, the file will be marked as being in error and the next file will be examined starting at Step 5.

If the combinations are legal, each file switch will be examined S8–S13 against the information stored in the file allocation tables 44. The results of the file operation will be reported S14, possibly as a listing on a visual display and a summary list will be updated 15 with the results, this process will be repeated for each listed file.

After all files have been processed S16, a return code will be computed S17. This will be an one byte code to indicate that the process found no errors and was successful, or found an error. If it did, it will list an appropriate error code for the encountered error. A summary of the results of the complete process will be provided for displaying on the monitor 16. All temporary files created by the process will be cleared S19 and the system will return to the start position, waiting for the next cycle through the file seal module 40.

Figure 3:
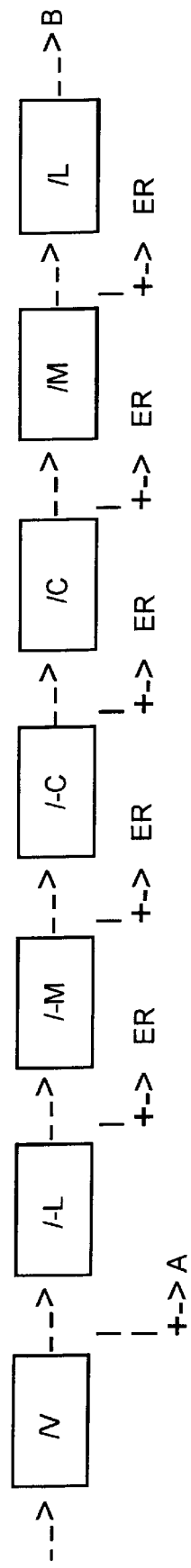
FIG. 3 is a block diagram depicting the order in which the file seal module of FIG. 1 examines files according to the present invention.

FIG. 3 shows a block diagram depicting the order in which the file seal module 40 operates on files. Each operational switch specified on the command line turns on its associated box. Boxes that are not turned on perform no operation and are simply a pass through to the next switch box.

Figure 4:
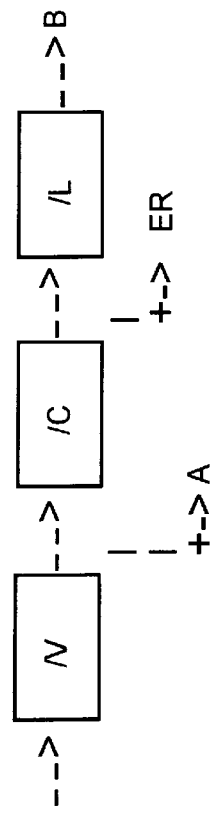
FIG. 4 illustrates an algorithm used for a command line syntax for each file as utilized by the present invention.

As an example, FIG. 4 illustrates an algorithm for the command line syntax:

sealfile /C /L file1.txt. After the banner, the program displays the results of the operation as:

{field}→_CL file1.txt CRC:02948657        (2)

The first attribute field, before the arrow, corresponds to "A" of FIG. 3 and the second attribute field, after the arrow, corresponds to "B". A file's attributes are transformed by each box. Transformation of the original file can be best understood using transformation charts, as disclosed in FIG. 5. Using a MCL format, the transformation chart can represent a file as being marked as sealed with a CRC, designated as M, as being locked, designated by L, or being told to append the CRC to the end of the file, designated by C. For example, the operation specified in FIG. 4 results in the following sequential transformations:

_→_C_→_CL        (3)

(sealfile)→(Append CRC to file)→(lock file including CRC)

A multi-switch command line can be broken down into a series of simple transformations. However, some transformations are illegal. The rules are listed for each possible transformation in the transformation chart in FIG. 5. At "A" the file seal module 40 will pre-verify the entire command sequence before performing the actual operation. If the operation cannot be performed, then the module will display an error message after the file name instead of the CRC value. If an error is encountered during the actual processing of a file, the file attributes at the time of the error are displayed where "B" is normally displayed. In addition, the file seal module 40 program will display an error message after the file name instead of the CRC value. The message will be highlighted to indicate that this is an unusual.

condition. The file seal module 40 will not back out changes already made to the file. Other errors may also be encountered during file processing, for example DOS errors, I/O stream errors, and memory allocation errors. Such conditions will be handled in a similar way.

Referring to FIG. 5, the first three switches have no error conditions. FIG. 6 provides a table of possible error messages. The error messages shown are not exactly those reported by the file seal module 40, but are representative of the error condition itself. This is not the full set of state transitions. The seals may be permanent and may contain an optional version label which must also be accounted.

After the file seal module 40 has processed a file, it will return a one byte return code that can be interpreted as either a successful or failure. Considering all files that match the file specifications, the four fields for LOCK, SEAL, CRC, and MARK could have values ranging from 0 to indicate all files are verified, to 3 to indicate an error. If an ERROR is encountered while processing the files, the error level returned will range from 0×F0 (240) to 0×FF (255). The RETURN CODE will contain the code for the first ERROR encountered.

The file seal module 40 will append a CRC record at the end of a file in the following form:

File

^Z

Optional Records

^Z

CRC Signature

CRC:12345678

Read/Write

Offset to top

\*\*\*:)

The ^Z is an EOF mark and the CRC is stored in ASCII format. Optional records will be inserted before the CRC record. The CRC signature is seven bytes long in the form of "n\rXXX:". Read/write is the enable flag for permiting the seal file utility to overwrite the seal. A read-only seal is permanent. The file seal module 40 will not change or remove a read-only seal. The Offset to the top permits the adding of additional records, such as the version record, to the seal and points to the top of the stack of records. The characters at the end are a password to provide a security measure to ensure that a random stream of bytes is not interpreted as a seal.

The file seal module 40 allows files of any kind to be uniquely identified by appending the version string and the CRC at the end of the file. The added information is non-destructive. Once appended, the record will be transported with the file when it is either moved or copied. If the optional version label is used, it is inserted before the CRC record. Its format for the record is:

$$\tilde{}Z \qquad (5)$$

Version Signature

Version Number

Additional records are stacked on top of the CRC record and could be added in the future. CRC is for the file and all additional records. Corrupting the version record will break the seal even if the original file is untouched.

The bill of materials 46 for a particular installation will list the version number for each file. These files could be stored on hard medium or be part of a program memory. The file seal module 40 requires some free memory space to use as a temporary buffer to make a list of the files to process. The file must be large enough to hold the path name of all files that are to be processed. Executables, object files, DLL libraries, and other binary files have file length stored in their header. In many systems, the software loaders use the file size stored in the file header, so it does not matter if the actual file has unspecified data after EOF mark. The modified CRC acts as a helpful virus. While not all programs have virus detection programs, those that have do not consider the file seal to be a virus and will ignore it. Editing or copying a sealed file will break the seal because the archive bit will be set. If a file is copied, then the new file will have the archive bit set. Renaming or moving a file does not change the archive bit.

The present invention will provide security for the files in the system. This protects the system from potential errors that might occur to file or memory corruption. The operating system will provide checksum security through use of the CRC, runtime security, and file security through the version number. The checksum is verified when the system is started and will abort the startup if any task contains an invalid checksum. The operating system will perform the same verification for its own code. This feature is always enabled. The operating system tasks and all system tasks are permanently sealed with a CRC and marked to determine whether or not the file's seal must be verified. During startup, the integrity of each marked file is verified against the CRC in the file's seal and file allocation table 44. Any discrepancy will cause an error message and prevent completion of the startup procedures.

The file version protection will prevent a system from starting or running if all system tasks and application program do not have the same version number as stored in the bill of material listing 46. Since many control systems use personal computers, these programs are installed from files stored on floppy disks or hard disks. Changes to these files or new files can be downloaded while the control system is off-line. If the wrong version file number is downloaded, unintended operation of the control system could occur. The file seal module 40 will compare the file's version number with the system bill of materials during the startup sequence and while an application is running. If an error is detected, the system will shutdown and display an error message indicating the cause for the shutdown.

While the specific embodiments have been illustrated and described, numerous modifications are possible without departing from the scope or spirit of the invention. After the files have been checked during startup, a loaded image of all system and user tasks will automatically register memory regions containing the code generated during startup. The operating system 14 can compute a 32 bit CRC for this memory and continuously verify that it is not corrupt during runtime, providing validity checks during runtime.

Although a typical control system has been described, the methods outlined above are adaptable to any type of file security methods which are used to verify the validity of installed or downloaded files.

I claim:

1. A method for checking integrity of a file used in the execution of an application program, the application program for use by a central processing unit (CPU) having an operating system, the method comprising:

A. computing a checksum record for the file before installing said file in the application program;

B. generating a sealing string for the file, the sealing string including the checksum record of said file and any optional records;

C. appending the sealing string to an end of said file;

D. generating a listing of all applicable files pertinant to the operation of said application program, said listing including the sealing string of the file, said listing accessible by said CPU;

E. installing said appended file in the application program;

F. processing said installed file to decode its appended sealing string; and verifying a binary integrity of said file;

G. preventing operation of said application program if said binary integrity fails.

2. The method of claim 1 wherein said checksum record is a cyclic redundancy check or CRC calculation.

3. The method of claim 2 wherein one of said optional records in the sealing string is a version record for said file, said version string identifying a particular version of said file, said version label to prevent operation of said application program if it does not compare with a version label stored in said applicable files listing.

4. The method of claim 3 further including means for identifying various attributes of said file, including status of a series of logic switches associated with said file.

5. The method of claim 4 wherein said attribute is a logic switch C indicating that the file has a checksum appended to the end of the file.

6. The method of claim 4 wherein said attribute is a logic switch M marking that the file has been sealed with a checksum, providing that the CRC is correct.

7. The method of claim 4 wherein said attribute is a logic switch L locking the file that has been sealed with a checksum.

8. The method of claim 4 wherein processing said installed file to decode its appended sealing string and comparing it with the stored sealing string is initiated at system startup of said application program.

* * * * *